United States Patent [19]

Vogel et al.

[11] 3,851,682
[45] Dec. 3, 1974

[54] DIGITALLY CONTROLLED WINDING APPARATUS AND METHOD

[75] Inventors: Ralph A. Vogel, Three Rivers, Mich.; Donald L. Anderson, Fort Wayne, Ind.; Robert A. Chattin, Mundelein; Joel L. Mosak, Glenview, both of Ill.

[73] Assignee: Essex International Inc., Fort Wayne, Ind.

[22] Filed: June 4, 1973

[21] Appl. No.: 366,368

[52] U.S. Cl.................. 140/92.1, 318/601, 318/603
[51] Int. Cl............................................. B21f 3/04
[58] Field of Search............... 140/92.1; 242/DIG. 1; 318/601, 603; 340/268

[56] References Cited
UNITED STATES PATENTS

| | | | |
|---|---|---|---|
| 2,964,252 | 12/1960 | Rosenberg | 318/603 |
| 3,278,817 | 10/1966 | Johnson et al. | 318/601 |
| 3,539,895 | 11/1970 | McGee | 318/601 |
| 3,636,990 | 1/1972 | Eminger et al. | 140/92.1 |
| 3,657,628 | 4/1972 | Chesney et al. | 242/DIG. 1 |
| 3,668,500 | 6/1972 | Kosem | 318/603 |
| 3,725,889 | 4/1973 | Glosek | 340/268 |

Primary Examiner—Lowell A. Larson

[57] ABSTRACT

A digital control system for apparatus for winding concentric dynamoelectric machine field coils on stepped coil forms employing a flyer mounted on a shaft, a first drive for rotating the shaft and flyer, and a second drive for linearly moving the carriage so as to traverse the flyer with respect to the coil form. The control includes a first pulse generator for providing a predetermined number of first signal pulses in response to a predetermined incremental linear movement of the carriage, a second pulse generator for generating a number of second signal pulses in response to each revolution of the shaft, a digital comparator for continuously comparing the numbers of first and second signal pulses and for providing an error signal in response to a difference therein which controls the speed of the second drive and thus the speed of linear movement of the carriage and flyer thereby to provide a predetermined pitch for the coils, and selector switches for preselecting the number of second signal pulses generated in response to each revolution of the shaft thereby to preselect the pitch for each coil.

27 Claims, 10 Drawing Figures

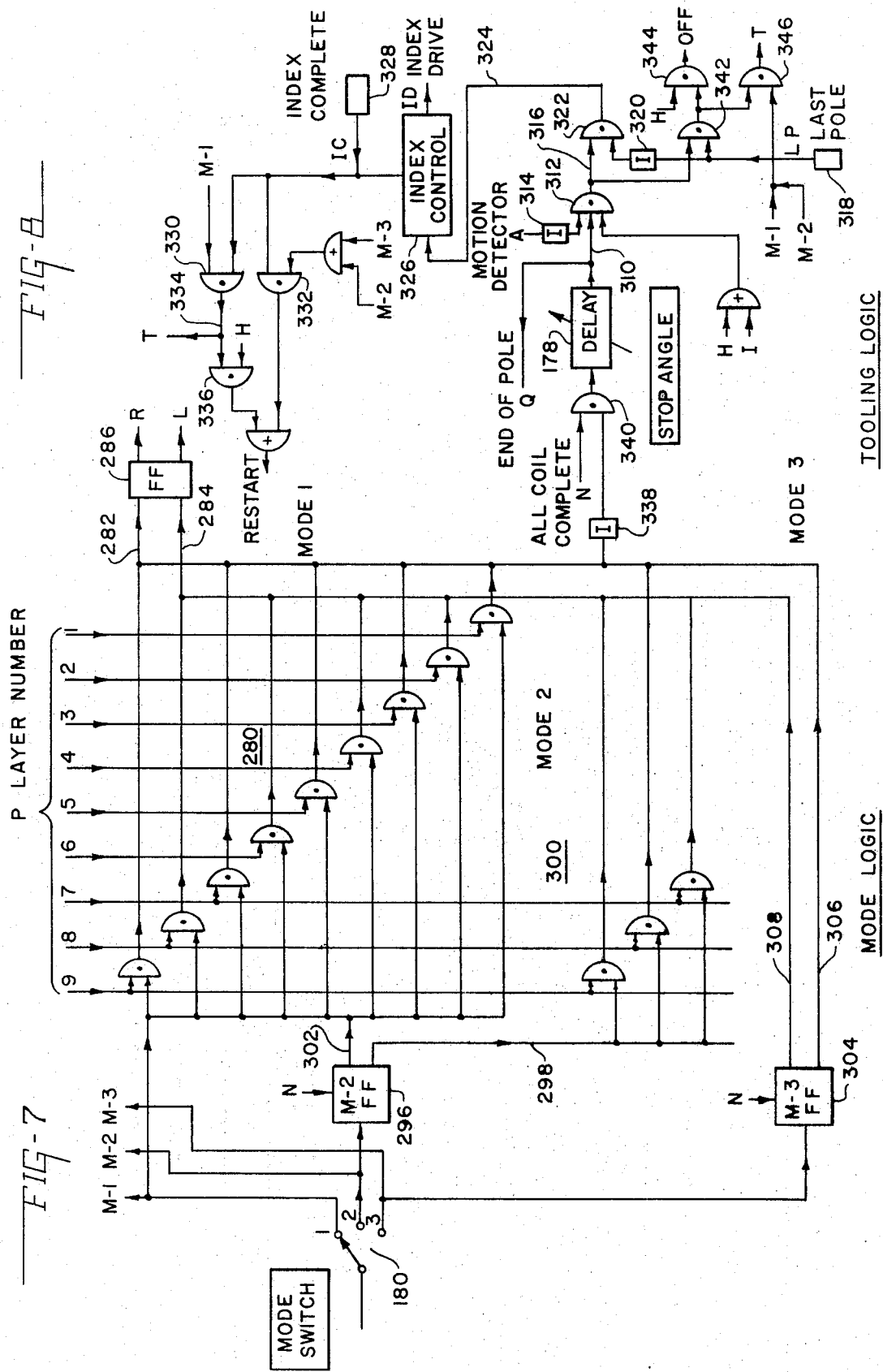

DIGITALLY CONTROLLED WINDING APPARATUS AND METHOD

BACKGROUND OF THE INVENTION

1. Field of the Invention

This invention relates generally to apparatus and methods for winding concentric dynamoelectric machine coils, and more particularly to a digitally controlled coil winding apparatus and method.

2. Description of the Prior Art

In the winding of concentric dynamoelectric machine field coils, it is conventional practice to wind magnet wire with a flyer upon progressively smaller steps of a stepped coil form, the wire wound upon each step thus forming one coil. Typically, each coil of a pole group has a different number of turns and further, while the coils for certain stator cores may be random wound in a plurality of layers, the coils for other stator cores are required to be precision-wound in a single layer.

In the winding of such concentric dynamoelectric machine field coils, it is thus necessary to wind the desired number of turns on each coil form step with the requisite traversing motion of the flyer, and also to step or jump the flyer from one coil form step to the next. Further, the differing numbers of coils required for different stators, and the widely differing numbers of turns for such coils, dictate coil forms of differing lengths and having different numbers of steps, in turn dictating different lengths of traverse and jump or step distances for the flyer. Prior apparatus for winding concentric dynamoelectric machine field coils, such as that shown for example in U.S. Pat. Nos. 3,036,603 to Harry W. Moore, 3,508,316 to Donald E. Hill, and 3,575,219 to Robert J. Eminger, the latter patent being assigned to the assignee of the present application, employed such mechanical devices as heart-shaped cams and lead screws for providing the flyer traversing motion, and mechanically adjustable stops and latches for providing the stepping action. Electromagnetic control programmed by limit switches, such as for example shown in U.S. Pat. No. 3,578,034 to Robert J. Eminger, and also assigned to the assignee of the present application, was commonly employed for such prior winding machines.

Another type of coil winding machine manufactured by Balzer & Droll, KG of Frankfort, West Germany, referred as Statomat type AW1, employs a hydraulic cylinder for traversing the flyer with adjustable stops and limit switches controlling the traversing and stepping motion.

Prior apparatus of the type described above for winding concentric dynamoelectric machine coils not only employ complex mechanical mechanisms for providing the traversing and stepping operations, and complex electromechanical relay and limit switch systems for programming the operation, but also required substantial set-up time for adjusting and changing stops, limit switches, cam, and the like, for winding each different set of coils.

U.S. Pat. No. 3,657,628 discloses a programmed coil winding machine employing a tape or other record medium for winding realy coils and the like. It is also known to wind bobbin-type coils using a digitally controlled, closed loop servo system.

SUMMARY OF THE INVENTION

The apparatus and method of the invention is embodied in and employs apparatus for winding at least two concentric dynamoelectric machine field coils upon a coil form having at least two steps of progressively smaller size and including flyer means mounted on a shaft for winding wire upon the steps to form the coils, means for rotatably supporting the shaft, first drive means for rotating the shaft and flyer means relative to the coil form, means for mounting the supporting means for linear movement parallel with the axis of the shaft, and second drive means for moving the supporting means linearly on the mounting means thereby to traverse the flyer means with respect to the coil form. The invention, in its broader aspects, provides means for generating a first electrical signal having a first characteristic proportional to a predetermined incremental linear movement of the supporting means, and second means for generating a second electrical signal having a second characteristic proportional to a predetermined incremental angular movement of the shaft. Means are provided for comparing the first and second characteristics and for generating an electrical error signal in response to a difference therein, and for controlling the speed of one of the drive means in response to the error signal thereby to provide a predetermined pitch for the coils. Means are provided for selectively varying the ratio of one of the first and second characteristics with respect to the respective incremental movement thereby to vary the pitch of the coils.

More particularly, the first and second signals are pulsed signals which are digitally compared, and a third pulsed signal is provided which is digitally compared with the first signal to provide another error signal thereby to provide the requisite stepping movement of the flyer between coils.

The apparatus and method of the invention by digitally controlling the movement of the flyer with respect to the coil form permits immediate preselection of the number of coils to be wound, the number of layers in each coil, the number of turns and pitch for each layer of each coil, and the jump distance between each coil thereby eliminating the set-up time required in the case of prior coil winding machines. The digitally controlled system also permits the use of solid state components thus substantially reducing the size and complexity of the control with respect to the electromagnetic control previously employeed and reducing the maintenance problems inherent in such prior control systems.

It is accordingly an object of the present invention to provide improved apparatus for winding concentric dynamoelectric machine field coils.

Another object of the invention is to provide a digital control system for dynamoelectric machine field coil winding apparatus.

A further object of the invention is to provide an improved method of winding concentric dynamoelectric machine field coils.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 7 schematically illustrates the mode selection logic portion of the control system;

FIG. 8 schematically illustrates the tooling logic portion of the control system;

DESCRIPTION OF THE PREFERRED EMBODIMENT

Figure 1:
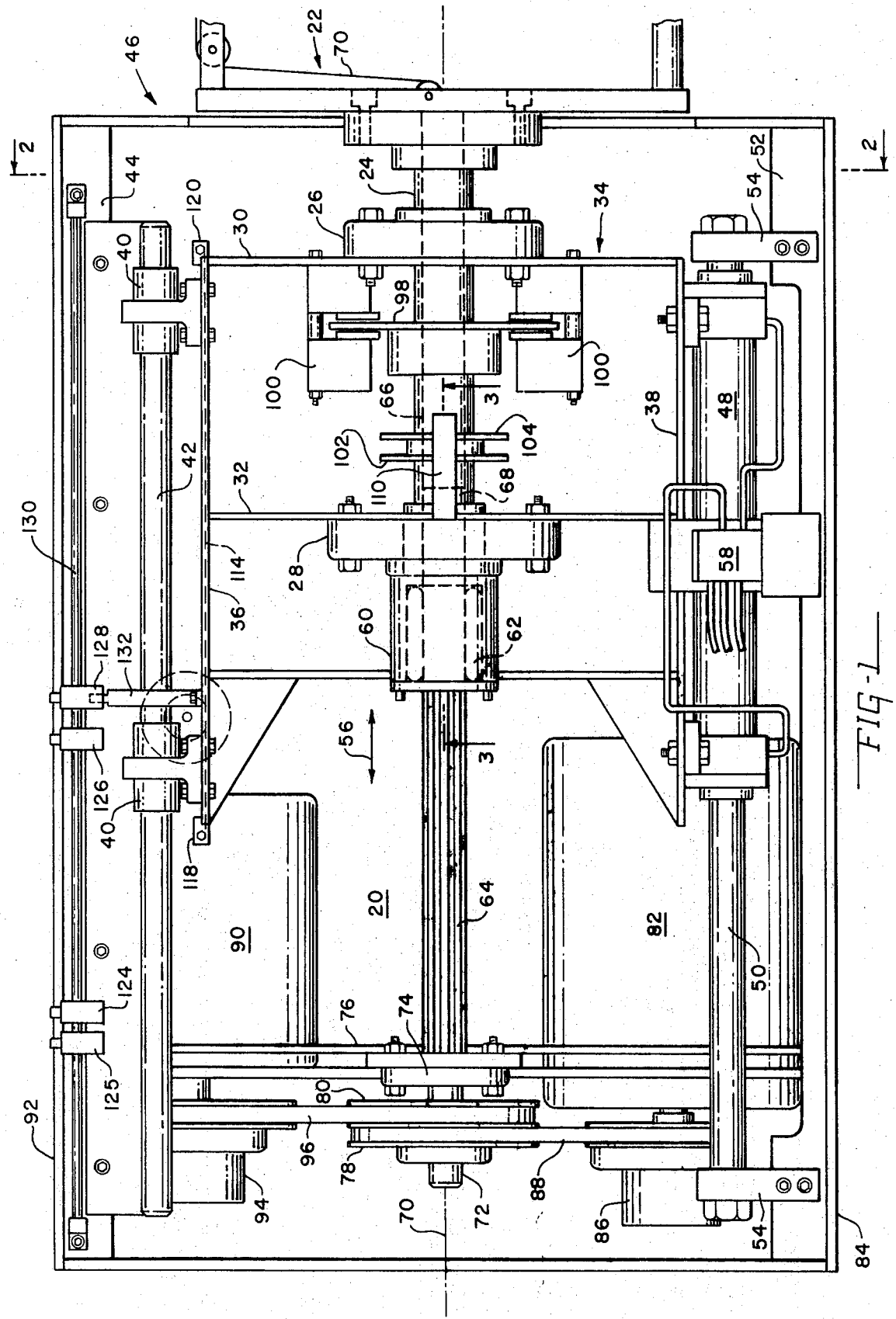
FIG. 1 is a top view of the improved apparatus of the invention.
Figure 2:
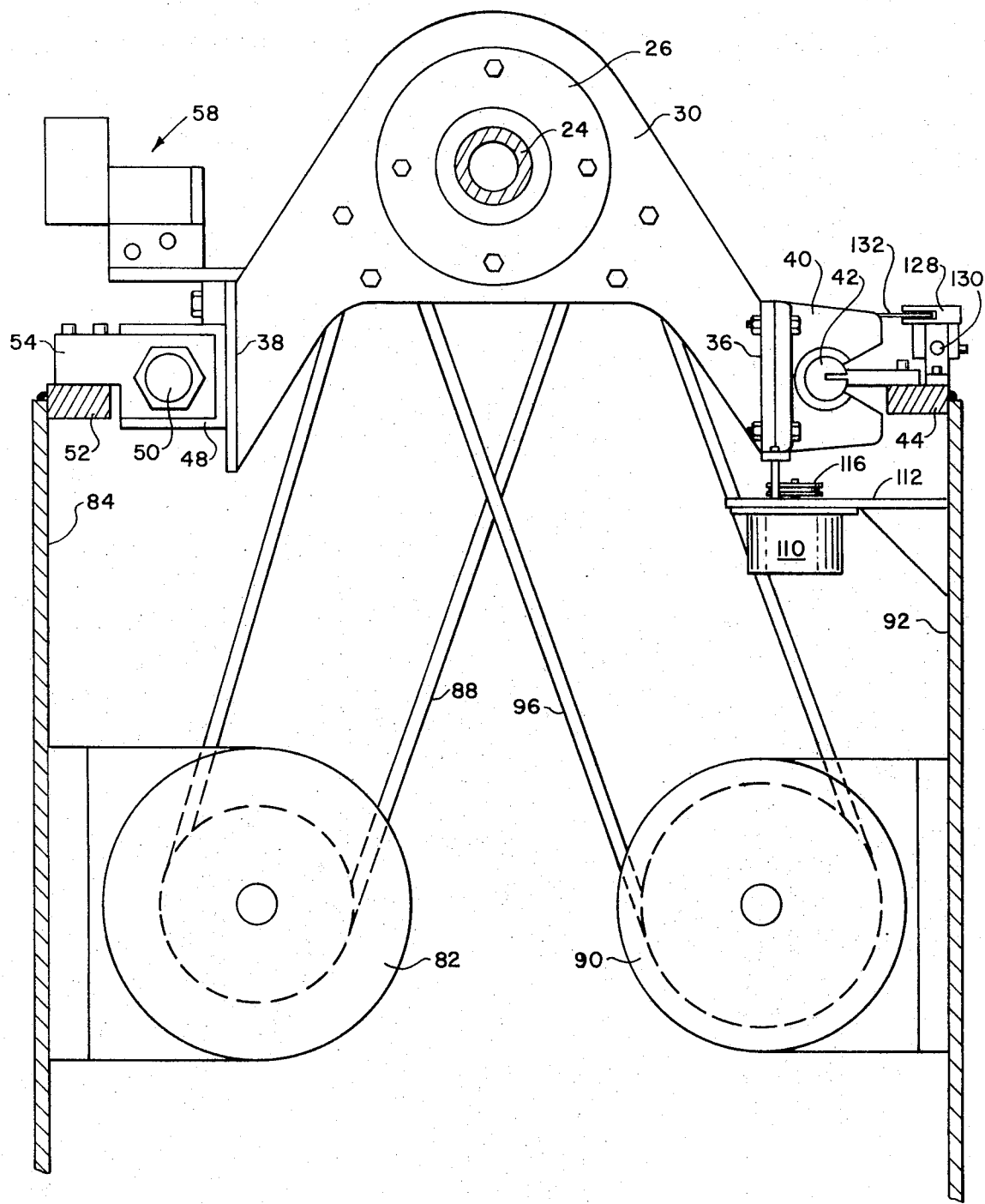
FIG. 2 is a cross-sectional view taken generally along the line 2—2 of FIG. 1.
Figure 3:
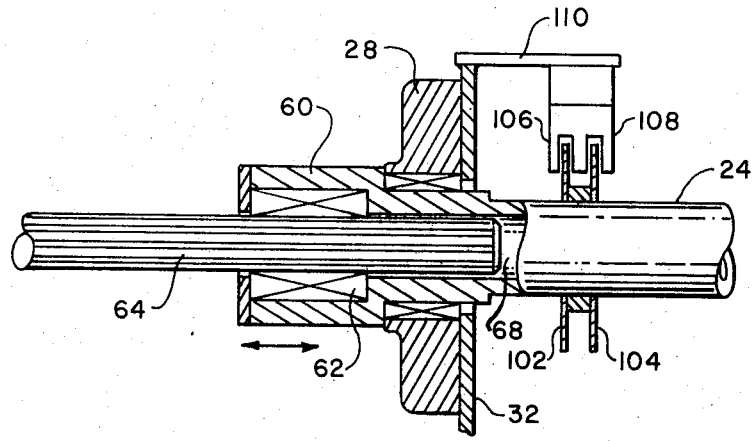
FIG. 3 is a fragmentary cross-sectional view taken generally along the line 3—3 of FIG. 1.

Referring now to FIGS. 1, 2 and 3 of the drawings, the apparatus of the invention, generally indicated at 20 includes flyer 22 mounted on shaft 24. Shaft 24 is rotatably journalled in bearings 26, 28 respectively mounted on transverse plate members 30, 32 of carriage 34. Transverse plate members 30, 32 are respectively joined to side plate members 36, 38. Side plate member 36 is supported by bearings 40 on rail 42. Rail 42 is mounted on side element 44 of frame 46.

Hydraulic cylinder 48 is mounted on side plate member 38 of carriage 34 and its piston rod 50 is mounted on side element 52 of frame 46 by brackets 54. Rail 42 and piston rod 50 thus support carriage 34, shaft 24 and flyer 22 for linear movement parallel with the axis of shaft 24, as shown by arrows 56. Operation of cylinder 48 is controlled by servo valve 58.

Shaft 24 includes hub portion 60 and housing splined member 62 cooperating with splined drive shaft 64 which rotatably drives shaft 24. Shaft 24 has central opening 66 therethrough which receives forward end 68 of splined shaft 64. Wire 70 with which the coils are wound passes through opening 66 in shaft 24 and through a central opening (not shown) in splined shaft 64.

Rear end 72 of splined shaft 64 is journalled in bearing 74 mounted on transverse member 76 of frame 46. Drive pulleys 78, 80 are mounted on end 72 of splined shaft 64. Motor 82, such as a synchronous motor, mounted on side plate member 84 of frame 46, drives splined shaft 64, shaft 24 and flyer 22 at slow speed through clutch 86, belt 88 and pulley 78. Motor 90, such as an induction motor, mounted on side plate member 92 of frame 46, drives splined shaft 64, shaft 24 and flyer 22 at high speed through clutch 94, belt 96 and pulley 80.

Brake disc 98 on shaft 24 cooperates with caliper brake coil and pad assemblies 100 mounted on plate member 30 of carriage 34 for rapidly stopping shaft 24 and flyer 22. Two-segment counting wheel 102 and ten-segment pulse generating wheel 104 are mounted on shaft 24 and respectively cooperate with pick-ups 106, 108 mounted on bracket 110 on transverse plate member 32 of carriage 34 (FIG. 3). Counting wheel 102 generates two pulses for each revolution of shaft 24 and pulse generator wheel 104 generates ten pulses for each revolution.

Linear motion pulse generator 110 is mounted on side plate member 92 of frame 46 by bracket 112 and is driven by wire 114 trained around pulley 116 and having its opposite ends secured to the opposite ends of side plate member 36 of carriage 34 by brackets 118, 120. Thus, linear motion of carriage 34 results in rotating pulse generator 110 thereby to generate a predetermined number of pulses in response to each incremental linear movement of carriage 34; in a specific embodiment, pulse generator 110 generates 1,000 pulses for each 1-inch linear movement of carriage 34.

R.F. pickups 122, 124, 126 and 128 are adjustably mounted on rod 130 secured to side member 44 of frame 46, and cooperate with blade element 132 mounted on side plate member 36 of carriage 34 to generate control sognals when blade element 132 moves into proximity thereto.

Figure 5:
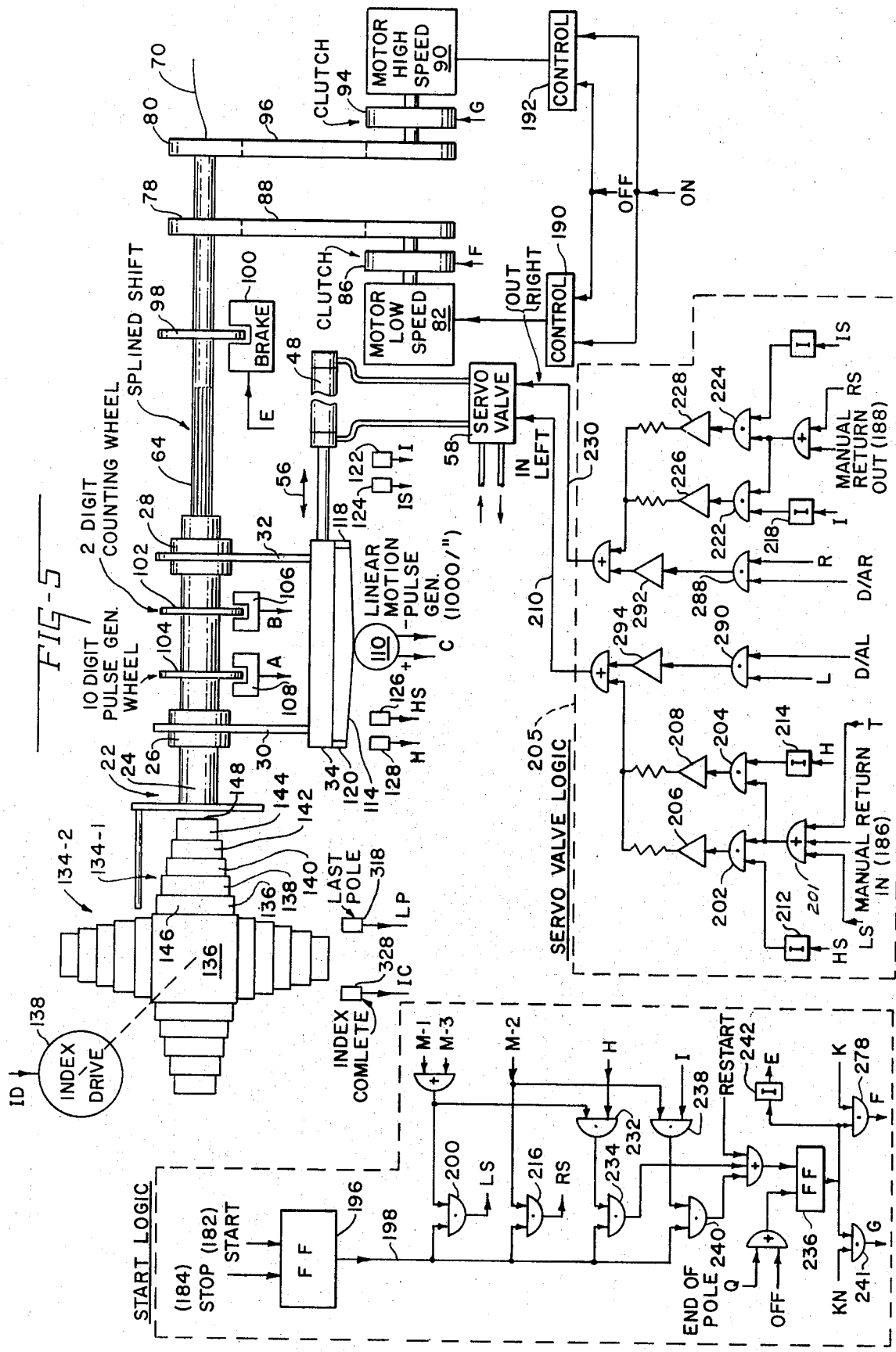
FIG. 5 schematically illustrates the apparatus of the invention and the starting and servo valve control logic portions of the digital control system employed therewith.

Flyer 22 winds wire 70 on the steps of stepped coil forms 134 respectively having their proximal ends 146 mounted on rotatable turret 136 driven by index drive motor 138 (FIG. 5). In the illustrated embodiment, four coil forms 134 are provided each having five progressively smaller steps 136, 138, 140, 142, 144 extending between its proximal end 146 and its distal end 148.

Figure 4:
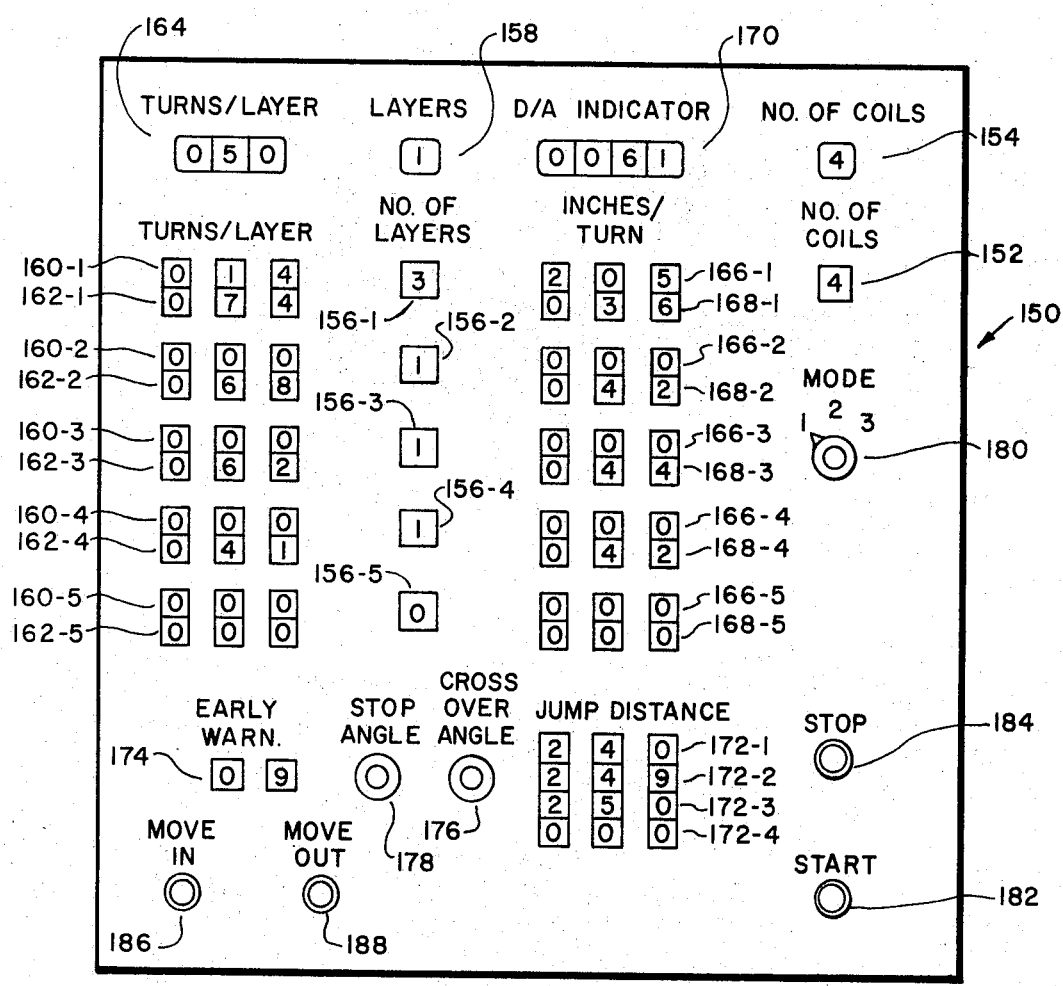
FIG. 4 is a view of the control panel employed with the apparatus of the invention.

Referring now to FIG. 4, control panel 150 includes manually actuated selector switch 152, such as a thumb switch, for selecting the number of coils to be wound which, in the illustrated embodiment, may be any number from one to five. Indicator 154, which may be any suitable display device such as a "Nixie" tube, displays a number corresponding to the number of the coil being wound.

Selector switches 156–1 through 156–5 are provided for respectively selecting the number of layers to be provided in each coil. In the illustrated embodiment, each coil may have one, three, five, seven or nine layers. Indicator 158 displays the number of the particular layer of the particular coil being wound.

Turns-per-layer switches 160 are provided for selecting the number of turns for each layer of the respective coil other than the last layer, and turns-per-layer switches 162 are provided for selecting the number of turns for the last layer of each coil. Thus, turns-per-layer switches 160–1 select the number of turns per layer for each layer other than the last layer of coil 1 which, in each instance, is the first coil to be wound, switches 162–1 select the number of turns per layer for the last layer of the first coil, switches 160–2 select the number of turns per layer for each layer other than the last layer of the second coil to be wound, selector switches 162–2 select the number of turns per layer of the last layer of the second coil to be wound, et seq. Indicator 164 displays a number corresponding to the number of turns which have been wound in a respective layer, i.e., if switches 162–1 are set to call for seventy-four turns in the last layer of the first coil (or the only layer if one layer is called for), and fifty turns have been wound on that layer, indicator 164 will display the number 24.

Inches-per-turn or pitch selector switches 166 are provided for selecting the pitch (in thousandths of an inch) for each layer other than the last layer of each coil, and selector switches 168 are provided for selecting the inches per turn or pitch of the last layer of each coil. Thus, switches 166-1 select the pitch for the layers other than the last of the first coil to be wound, switches 168-1 select the pitch of the last layer of the first coil, switches 166-2 select the pitch of the layers other than the last of the second coil to be wound, switches 168-2 select the pitch of the last layer of the second coil, et seq. Indicator 170 continously displays a number corresponding to the error (to be hereinafter described) in thousandths of an inch.

Selector switches 172 select the step or jump distance between each coil (in thousandths of an inch). Thus, selector switches 172-1 select the jump distance between the first and second coils to be wound, for example a first coil of step 136 and a second coil on step 138, selector switches 172-2 select the jump distance between the second and third coils to be wound, et seq. Early warning selector switches 174 select the number of turns in advance of completion of a coil for an early warning signal as will be hereinafter described. Adjustable delay 176 determines the angular location of the cross-over connections between each coil, and adjustable delay 178 determines the angular stopping position of flyer 22.

Selector switch 180 selects one of three available modes of operation. In the first mode, flyer 22 is initially positioned in winding relationship with the largest coil form step 136 of a particular coil form and is then traversed outwardly so that the coils are sequentially wound on progressively smaller coil form steps. Turret 136 is then indexed to position another coil form 134 in winding relationship with flyer 22, the flyer is returned to an initial position in winding relationship with the largest step 136, and the flyer is again traversed outwardly to wind the next set of coils on the next coil form in the same fashion, i.e., sequentially from the largest to the smallest. In the second mode, flyer 22 is initially positioned in winding relationship with the smallest coil form step, 144, and is then traversed inwardly sequentially to wind coils from the smallest to the largest. Turret 136 is then indexed and flyer 22 is then traversed outwardly sequentially to wind the next set of coils from the largest to the smallest. In the third mode, flyer 22 is initially positioned in winding relationship with the largest coil form step 136, is traversed outwardly sequentially to wind a first part of each coil progressing from the largest to the smallest, and is then traversed inwardly sequentially to wind the remaining part of each coil progressing from the smallest to the largest.

Manually actuated "start" and "stop" switch buttons 182, 184 are provided along with manually actuated switch buttons 186, 188 for respectively moving carriage 34 and flyer 22 toward the right (out) or toward the left (in) as viewed in FIG. 5.

Referring now to FIG. 5, low speed drive motor 82 and high speed motor 90 are respectively energized by control circuits 190, 192 which do not form a part of the present invention. Starting logic circuit shown within the dashed-line box 194 includes flip-flop 196 set to provide an enabling signal in line 198 by actuation of start switch 182. A mode one or mode three signal in line M-1 or M-3 from mode switch 180 (FIG. 7) results in a signal in output line LS of AND gate 201 applied to AND gates 202, 204 of the servo valve logic shown within the dashed-line box 205 (FIG. 5). Assuming now that carriage 34 has not previously been traversed to its extreme "in" or "left" position as viewed in FIG. 5, so that blade 132 (FIGS. 1 and 2) is actuating neither pick-up 126 nor pick-up 128, inverted signals will be applied to both AND gates 202, 204 from pick-ups 126, 128 resulting in application of signals to both amplifiers 206, 208 and application of a signal to "in" input line 210 of servo valve 58 thus actuating cylinder 48 to move carriage 34, shaft 24, and flyer 22 rapidly toward the left as viewed in FIG. 5. When carriage 34 has been moved sufficiently toward the left so that blade 132 actuates pick-up 126, a signal appears in line HS which, when inverted by inverter 212 causes removal of a signal from AND gate 202 and removal of the signal provided by amplifier 206, thus reducing the level of the input signal to servo valve 58 in line 210, in turn reducing the rate of leftward movement of carriage 34 to flyer 22 provided by cylinder 48. When carriage 34 has been moved to an extreme leftward position as sensed by blade 132 actuating pick-up 128, a signal appears in line H which when inverted by inverter 214 removes the signal from AND gate 204 and the signal provided by amplifier 208, thus removing the signal from input line 210 of servo valve 58 to terminate actuation of cylinder 48 and further leftward movement of flyer 22, flyer 22 now being positioned in winding relationship with the largest step 136 of coil form 134-1.

If mode switch 180 is positioned to select the second mode, a signal appears in line M-2 resulting in appearance of a signal in output line RS of AND gate 216 which, in similar fashion, causes servo valve 58 to actuate cylinder 48 to move carriage 34, shaft 24 and flyer 22 toward the right as viewed in FIG. 5 into winding relationship with the smallest step 144 of coil form 134-1, pickups 122, 124 and the respective output lines I, IS, inverters 218, 220, AND gates 222, 224, amplifiers 226, 228, and "out" or "right" input line 230 of servo valve 58 performing that function.

It will be observed that actuation of the "Move-in" switch 186 or "move-out" switch 188, as the case may be, similarly actuates the servo valve logic 206 to move carriage 34 and flyer 22 "in" (left) or "out" (right) as the case may be.

Assuming now that mode 1 or mode 3 is called for by mode switch 180, arrival of carriage 34 and flyer 22 at the extreme "in" or "left" position actuates pick-up 128 resulting in a signal in its output line H, and a signal in the output of AND gate 232 applied to AND gate 234, the resulting signal in the output circuit of AND gate 234 being applied to set flip-flop 236. Similarly, if mode switch 180 is set to call for mode 2 thus providing a signal in line M-2, arrival of carriage 34 and flyer 22 at the extreme right position results in actuation of pick-up 122 and a signal in its output line I will provide a signal in the output circuit of AND gate 238 which is applied to AND gate 240, the resulting signal in the output circuit of AND gate 240 being applied to set flip-flop 236.

Brake disc 98 is engaged thereby to stop shafts 64, 24 when brake coil 100 is energized and thus removal of a signal from brake coil input line E will de-energize the brake coil and release the braking action on brake disc 98. An output signal in the output circuit of flip-flop 236 is inverted by inverter 242 resulting in removal of the signal in input line E of brake coil 100 thus releasing the brake.

Assuming now that no early warning signal is provided by the turns, layers and coil logic in line K (FIG. 6), and correspondingly that a signal appears in line KN as a result of inverter 238, a signal appears in output circuit G of AND gate 241 which energizes clutch 94 thereby causing high speed motor 90 to drive splined shaft 64, shaft 24 and flyer 22 at high speed so as to commence winding wire 70 on the largest coil form step 136 of coil form 134–1 if mode switch 180 has been set to select either mode 1 or mode 3, or on the smallest coil form step 144 if mode switch 180 has been set to select mode 2.

Figure 6:
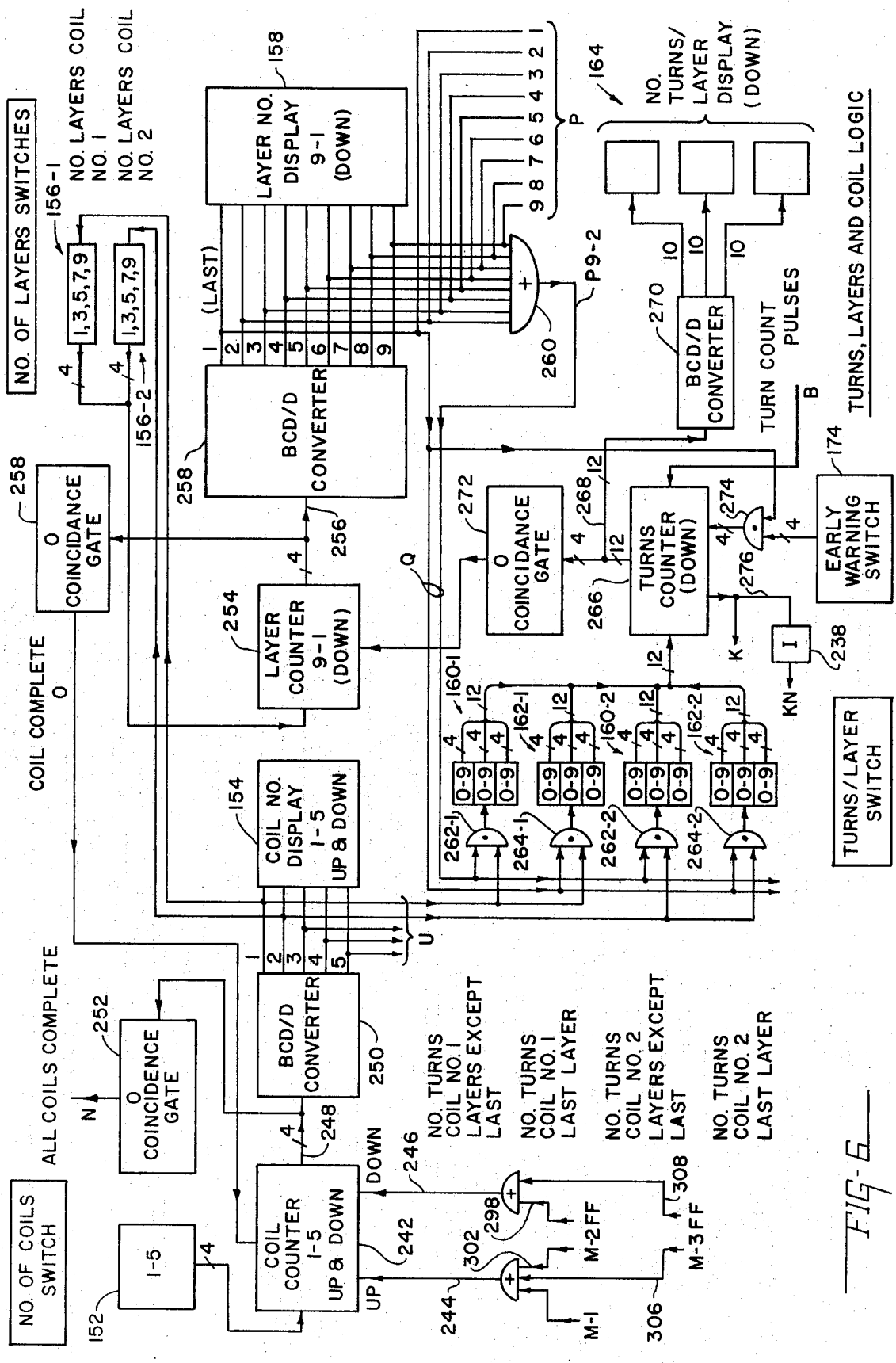
FIG. 6 schematically illustrates the turns, layers and coil logic portions of the control system.

Referring now to FIG. 6, number of coils switch 152 which is employed to preselect the number of coils to be wound, provides a coded number corresponding to the coil number selected which sets digital coil counter 242 to count that number. Coil counter 242 will count "up" i.e., from one to five when set for "up" counting by a signal in line 244, and will count "down," i.e., from five to one when set for "down" counting by a signal in line 246, the signals in lines 244, 246 being provided by the mode logic (FIG. 7). In mode one, coil counter 242 counts "up" during the winding of each pole group of coils, in mode two, coil counter 242 counts "up" during winding of the first pole group and "down" during winding of the second pole group, and in mode three, coil counter 242 counts "up" during winding of the first part of the coils on the respective coil form, and then "down" during winding of the second part of the coils on the same coil form.

Output circuits 248 of coil counter 242 are coupled to binary coded decimal-to-decimal (BCD/D) converter 250 which has its output citcuits U (five in number in the illustrated embodiment where up to five coils may be selected) coupled to coil member display device 154 which thus indicates the number of the coil currently being wound. Output circuits 248 of coil counter 242 are also coupled to zero coincidence gate 252 which provides a signal in its output circuit N indicating that all of the coils of a group have been wound in response to coil counter 242, counting "down" to zero or "up" to the number set on the number of coils selector switch 152.

Coil number indicating lines U from BCD/D converter 250 are respectively coupled to number-of-layers switches 156, i.e., coil number line U–1 is coupled to number-of-layers switch 156–1 and enables that switch during the winding of coil number 1, coil number line U–2 is coupled to number-of-layers switch 156–2 and enables that switch when coil number 2 is being wound, et seq. Number-of-layers switches 156 are employed to preselect the number of layers to be wound in each coil (in the illustrated embodiment one, three, five, seven or nine layers), and respectively provide in their output circuits binary coded numbers corresponding to the number of layers selected. The output circuits of number-of-layers switches 156 are coupled to digital layer counter 254 which counts "down" to zero from the number of layers selected by the respective switch 156. Output circuits 256 of layer counter 254 are coupled to binary coded decimal-to-decimal converter 258 which has its output circuits P (nine in the illustrated embodiment) coupled to layer number display device 158 which thus displays the number of the layer of each coil currently being wound.

Output circuits 256 of layer counter 254 are also coupled to zero coincidence gate 258 which thus provides a signal in its output circuit O indicating that the respective coil has been completed when layer counter 254 has counted down to zero. Output circuit O of coincidence gate 258 is coupled to actuate coil counter 242, each coil completion signal then causing coil counter 242 to count one digit "up" or "down" as described above.

Output circuits P 9–2, i.e., all except the last, are coupled by OR gate 260 to AND GATES 262–1, 262–2 et seq. Output circuits U of the coil number BCD/D converter 250 are respectively coupled to AND gates 262–1, 262–2 et seq. which respectively have their output circuits coupled to enable turns-per-layer switches 160–1, 160–2 et seq. Thus, turns-per-layer switch 160–1 is enabled during winding of all of the layers of coil number 1 other than the last, turns-per-layer switch 160–2 is enabled during winding of all of the layers of coil number 2, other than the last, et seq. Output circuit P–1 of layer BCD/D converter 258 is coupled to AND gates 264–1, 264–2 et seq., and output circuits U of coil BCD/D converter 250 are respectively coupled to AND gates 264–1, 264–2 et seq., which respectively have their output circuits coupled to turns-per-layer switches 162–1, 162–2, et seq. Thus, turns-per-layer switch 162–1 is enabled during winding of the last layer of coil number 1, turns-per-layer switch 162–2 is enabled during winding of the last layer of coil number 2, et seq.

Turns-per-layer switches 160, 162 preselect the number of turns to be wound and provide binary coded numbers in their output circuits corresponding to the respective number of turns per layer selected. The output circuits of turns-per-layer switches 160, 162 are coupled to set digital turns counter 266. Output circuit B of pick-up 106 for counting wheel 102 and shaft 24 is coupled to turns counter 266 which thus counts-down the revolutions of shaft 24 from the respective preselected number. Output circuits 268 of turns counter 266 are coupled to BCD/D converter 270 which has its output circuits coupled to number of turns layer indicator device 164 which thus continuously displays the number of turns of a given layer remaining to be wound. Output circuits 268 of turns counter 266 are also coupled to zero coincidence gate 272 which has its output circuit coupled to layer counter 254. Thus, completion of winding a preselected number of turns of a given layer of a particular coil results in appearance of a layer-complete signal in the output circuit coincidence gate 272 which is applied to actuate layer counter 254 to count-down the number of layers selected.

Early warning switch 174 has its output circuits coupled to AND gate 274 along with output circuit P–1 of layer BCD/D converter 258. Early warning switch 174 also provides in its output circuits a binary coded number corresponding to the number of turns for an early warning selected and thus, during winding of the last layer of a given coil, the preselected number of early warning turns is set into turns counter 266. When turns counter 266 has counted-down to the selected number of early warning turns during winding of the last layer of a given coil, a signal appears in early warning output line 276 which is applied to AND gate 278 (FIG. 5) resulting in a signal in its output circuit F which is applied to energize clutch 86 of low speed motor 82. Inverter 238 removes the signal from line KN previously applied to AND gate 241 thus removing the signal from its output line G de-energizing clutch 94 of high speed motor 90. Thus, upon appearance of the early warning signal in output circuit 276 of turns counter 266, clutch 94 is de-energized and clutch 86 is energized to drive the splined shaft 64, shaft 24 and flyer 22 at low speed during winding of the remaining turns of the last layer of the respective coil.

Referring now to FIG. 7 in conjunction with FIG. 5, it will be understood that in the first mode, layer number 1 (the last layer) and other odd numbered layers will be wound with flyer 22 traversed toward the right as viewed in FIG. 5 whereas the even numbered layers will be wound toward the left. Thus, mode switch line M–1 is coupled to the AND gates of matrix 280 with layer number lines P–1 through P–9 being coupled to alternate ones of the AND gates. The output circuits of the odd-numbered AND gates are coupled to set input circuit 282 of flip-flop 286 and the output circuits of the even-numbered AND gates are coupled to reset input circuit 284 of flip-flop 286, which has its output circuits R and L respectively coupled to AND gates 288, 290 of servo valve logic 206 (FIG. 5). Thus, when layer number nine of a given coil, or any other odd-numbered layer, is being wound, input circuit 282 of flip-flop 286 is energized thereby to provide a signal in output circuit R, and when layer number eight, or any other even-numbered layer of a given coil is being wound, input circuit 284 flip-flop 286 is energized thereby to provide a signal in output circuit L.

As will hereinafter be described in connection with FIG. 9, output circuits D/AR and D/AL of digital-to-analogue converter 374 of the inches-per-turn logic are also respectively coupled to AND gates 288, 290 which, in turn, respectively have their output circuits coupled to the "in/left" input circuit 210 and "out/right" input circuit 230 of servo valve 58 by amplifiers 292, 294. Thus, when layer number nine, or any other odd-numbered layer of the given coil is to be wound, servo valve 58 is actuated to actuate cylinder 48 to move carriage 34, shaft 24 and flyer 22 toward the right at a rate determined by the inches-per-turn logic circuit of FIG. 9, and when layer number eight, and any other even-numbered layer is being wound, servo valve 58 is actuated to actuate cylinder 48 to move carriage 34, shaft 24 and flyer 22 toward the left at a rate again determined by the inches-per-turn logic.

In the second mode, the ninth and other odd-numbered layers of the coils of the first pole group wound on coil form 134–1 are wound in the left direction as viewed in FIG. 5, the even-numbered coils being wound toward the right, whereas the ninth and other odd-numbered layers of the second pole group of coils to be wound on coil form 134–2 are wound in the same fashion as in mode one, i.e., toward the right as viewed in FIG. 5 with the even-numbered coils being wound toward the left.

Accordingly, in mode two, mode switch line M–2 is coupled to enable flip-flop 296 which is alternatively actuated between its set and re-set conditions by the coil complete signals appearing in coil complete output circuit N of coil coincidence gate 252 (FIG. 6). Thus, during winding of the coils of the first pole group on coil form 134–1, output circuit 298 is energized, output circuit 298 being coupled to the AND gates of matrix 300. The layer number lines P–1 through P–2 are alternately coupled to the AND gates of matrix 300, the output circuits of the odd-numbered AND gates being coupled to input circuit 284 of flip-flop 286 and the output circuits of the even-numbered AND gates being coupled to input circuit 282. Thus, when the ninth and other odd-numbered layers of the coils of the first pole group on coil form 134–1 are being wound, input circuit 284 of flip-flop 286 is energized thereby causing a signal to appear in output circuit L which actuates servo valve 58 to actuate cylinder 48 to move carriage 34 and flyer 22 toward the left at a rate determined by the inches-per-turn logic whereas, when the eighth and other even-numbered layers of the first pole group are being wound, input circuit 282 of flip-flop 286 is energized thereby causing a signal to appear in its output circuit R so as to actuate servo valve 58 and cylinder 48 to move carriage 34 and flyer 22 toward the right at a rate again determined by the inches-per-turn logic.

Upon completion of all of the coils comprising the first pole group wound on coil form 134–1, a signal appears in output circuit N of coincidence gate 252 (FIG. 6) which actuates flip-flop 296 to cause a signal to appear in its other output circuit 302 coupled to enable matrix 280 so that the layers of the coils of the second pole group wound on coil form 134–2 are wound in the same fashion as in the case of mode one.

In the third mode, a single layer may be wound on coil form 134–1 progressing toward the right as viewed in FIG. 5, followed by the winding of another single layer on the same coil form progressing toward the left. Alternatively, a larger, odd number of layers, i.e., three, five etc., may be wound successively on each step progressing toward the right, followed by winding the same number of layers successively on each step progressing toward the left.

Accordingly, mode switch line M–3 is coupled to enable flip-flop 304 which is alternately actuated between its two stable conditions by coil completion signals appearing in output circuit N of coil coincidence gate 252 (FIG. 6). Thus, during winding of the first layer forming the first part of the coils wound on the coil form 134–1, output circuit 306 of flip-flop 304 is energized thereby to energize input circuit 282 of flip-flop 286 causing a signal to appear in its output circuit R which actuates servo valve 58 and cylinder 48 to move carriage 34 and flyer 22 toward the right as viewed in FIG. 5 at a rate determined by the inches-per-turn logic. Upon completion of winding the first layer which comprises the first part of the coils, a signal appears in output circuit N of coincidence gate 252 which actuates flip-flop 34 to energize its output circuit 308 in turn energizing input circuit 284 of flip-flop 286 which causes a signal to appear in its output circuit L which, in turn, actuates servo valve 58 to actuate cylinder 48 so as to move carriage 34 and flyer 22 toward the left again at a rate determined by the inches-per-turn logic thereby to wind the layer which comprises the remaining part of the coils.

Referring now to FIG. 8 in conjunction with FIGS. 5 and 7, when all of the coils of a pole group have been completed, a signal appears in coil complete output circuit N of coil coincidence gate 252 (FIG. 6). Coil complete output circuit N is coupled by AND gate 340 to stop angle delay circuit 178 having its output circuit 310 coupled to AND gate 312 and to "end of pole" circuit Q coupled to reset flip-flop 236 of start logic 194 (FIG. 5). Resetting of flip-flop 236 terminates application of a signal to AND gate 241 (enabled by the signal in early warning output circuit KN as above described in connection with FIG. 6) thus deactuating clutch 86 to decouple low speed motor 82 from splined shaft 64. Termination of the signal in the output signal of flip-flop 236 by reason of inverter 242 results in application of a signal to brake circuit E thus energizing brake coil 100 to apply brake force on brake disc 98 thereby to stop flyer 42.

Output circuit A of pick-up 108 associated with pulse generator wheel 104 is coupled by inverter 314 to AND gate 312 thus serving as a motion detector circuit, complete stopping of shaft 24 and flyer 22 resulting in application of another signal to AND gate 312. Output circuits H and I of pick-ups 128, 122 are also coupled to AND gate 312 and thus, when rotation of shaft 24 and flyer 22 has stopped and carriage 34 has reached either its left or right extreme position, a signal appears in output circuit 316 of AND gate 312. Last pole pick-up 318 associated with turret 136 (FIG. 5) provides a signal in its output circuit LP when turret 136 has been indexed to a position in which the coils of the last pole group are to be wound. Inverter 320 couples last pole pick-up 318 to AND gate 322 to which output circuit 316 of AND gate 312 is also coupled. Thus, when a signal appears in output circuit 316 of AND gate 312 and turret 136 has not yet been indexed to its last pole group position, a signal appears in output circuit 324 of AND gate 322 which is applied to control 326 for index drive motor 138 actuating the same to energizing the index drive motor 138 to index turret 136 thereby to move coil form 134–1 out of winding relationship with flyer 22 and to move coil form 134–2 into winding relationship.

Pick-up 328 associated with turret 136 (FIG. 5) provides a signal in its output circuit IC when turret 136 has been indexed thus indicating that the next successive coil form 134 is properly positioned for winding. The signal in output circuit IC of pick-up 328 is applied to index control 326 to de-energize drive motor 138. Output circuit IC of index complete pick-up 328 is also coupled to AND gates 330, 332. Mode one line M–1 is coupled to AND gate 330 and mode two and three lines M–2 and M–3 are coupled to AND gate 332. Recalling that in mode one, following completion of winding the first pole group of coils on coil form 134–1 proceeding from the largest to the smallest, and following indexing of turret 136, flyer 22 is then moved to the left so as again to wind the first coil on the largest coil form step 136 of coil form 134–2, output circuit 334 of AND gate 330 is coupled to line T which is coupled in the servo valve logic system 206 as shown in FIG. 5. Thus, in mode one with line M–1 energized and upon completion of indexing causing appearance of a signal in output circuit IC of index complete pick-up 328, a signal appears in output circuit 334 of AND gate 330 which is applied to circuit T, that signal functioning in the same manner as application of the signal to line LS as described above in connection with starting logic 194, which actuates servo valve 58 in turn to actuate cylinder 48 to move carriage 34, shaft 24 and flyer 22 toward the left.

When carriage 34 and flyer 22 reach the extreme leftward position, as shown in FIG. 5, as sensed by pick-up 128, a signal appears in line H which is applied to AND gate 336 resulting in application of a signal to the RESTART circuit which is applied to set flip-flop 236 of the start logic (FIG. 5) thereby to initiate the next winding operation.

It is not necessary to return flyer 22 to its inner or left position as viewed in FIG. 5 following winding of the first pole group of coils in mode two and three and thus, mode switch lines M–2 and M–3 are coupled to AND gate 332 thereby to energize the RESTART circuit immediately upon appearance of a signal from the index complete pick-up 328.

It will be observed that a coil complete signal will appear in line N upon completion of winding the first part of the coils in mode three, i.e., with flyer 22 in its outer or right position. However, turret 136 is not to be indexed at this point but rather is to be indexed upon completion of the second part of the coils of the pole group, i.e., with flyer 22 returned to its inner or left position as viewed in FIG. 5. Energization of index drive motor 138 following completion of winding the first part of the coils of the pole group in mode three is inhibited by inverter 338 which couples output circuit 306 of mode three flip-flop 304 (FIG. 7) to AND gate 340. Thus, with mode switch 180 set for winding in mode three and with flip-flop 304 calling for traversing flyer 22 toward the right as viewed in FIG. 5, AND gate 340 is inhibited so that the appearance of a coil complete signal in line N following completion of the first part of the pole group of coils in mode three does not result in application of a signal to index control 326.

When turret 136 has been properly indexed to wind the last pole group of coils on a coil form 134, a signal appears in last pole pick-up 318 which, by reason by inverter 320, inhibits AND gate 322 thereby inhibiting index control 326 upon the appearance of coil complete signal in line N indicating completion of winding of the coils of the last pole group. However, the coil complete signal is applied to AND gate 342 which has its output circuit coupled to AND gate 344 along with output circuit H of pick-up 128 (FIG. 5) and thus, with turret 136 positioned for winding the last pole group, and upon completion of winding of the coils of that group, and upon carriage 34 and flyer 22 reaching the inner or left position, a signal appears in the "off" output circuit of AND gate 344 which resets flip-flop 236 of the starting logic 194 (FIG. 5) thereby to de-energize clutch 86 and to energize brake 100 so as to stop flyer 22.

It will be observed that in modes one and two, flyer 22 will not be in its inner or left position, as viewed in FIG. 5, upon completion of winding of all of the coils of the last pole group and thus, the output circuit of AND gate 342 is coupled to AND gate 346 along with mode switch lines M–1 and M–2. Thus, appearance of a coil complete signal results in a signal in output circuit T of AND gate 346 which is applied to the servo valve logic 206 (FIG. 5) to return carriage 34 and flyer 22 to the inner or left position.

Figure 9:
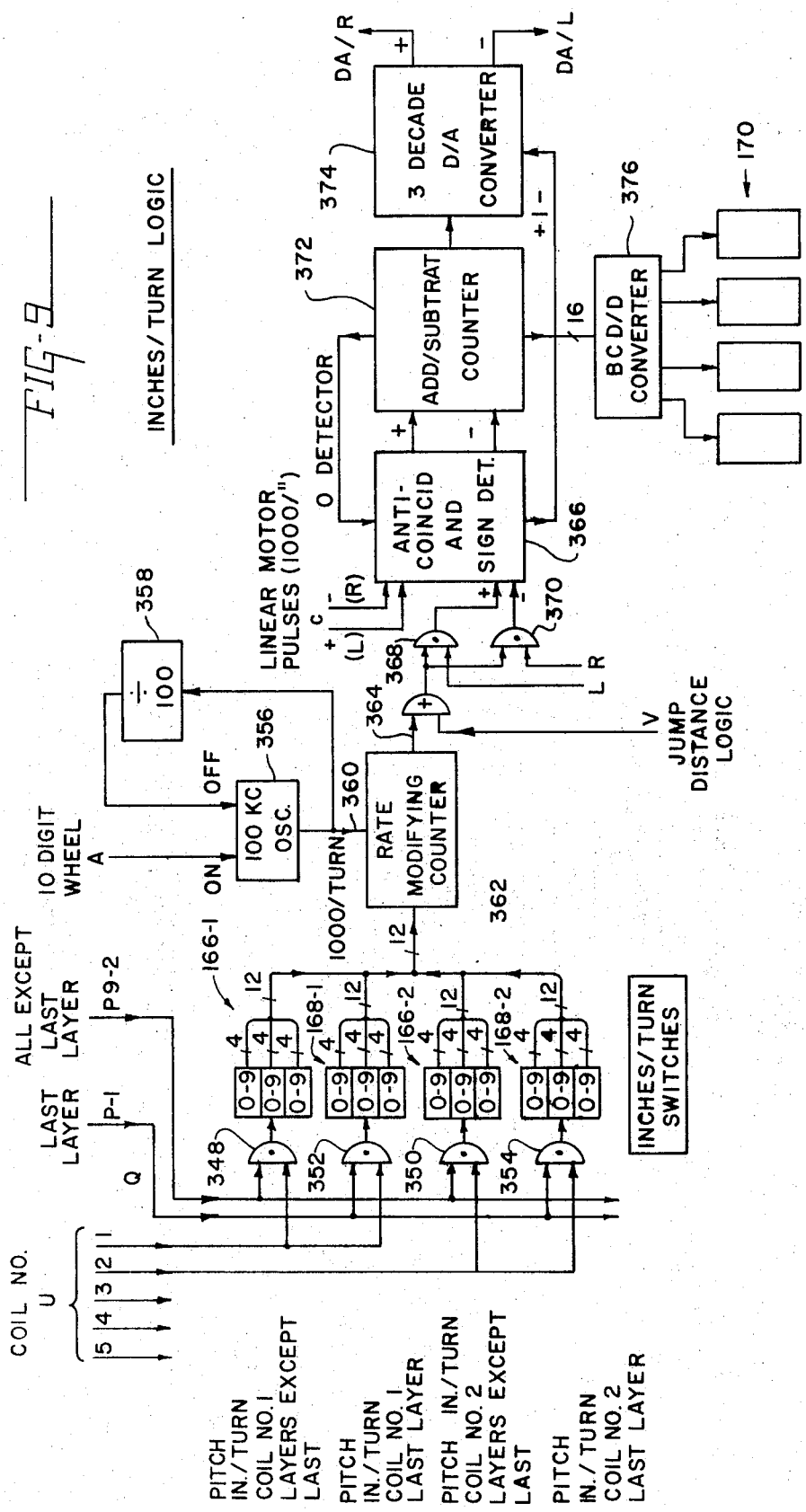
FIG. 9 schematically illustrates the inches per turn or pitch logic system.

Referring now to FIG. 9, inches per turn switches 166 preselect the inches per turn or pitch for the layers other than the last of each coil, and inches per turn switches 168 preselect the inches per turn or pitch for the last layer of each coil, switches 166, 168 respectively providing binary coded numbers corresponding to the preselected numbers.

Layer number line P 9–2 from OR gate 260 (FIG. 6) is coupled to AND gates 348, 350, et seq, having their output circuits respectively coupled to switches 166-1, 166-2, et seq and layer line P1 is coupled to AND gates 352, 354, et seq, respectively having their output circuits coupled to switches 168-1, 168-2, et seq. Coil number line U-1 is coupled to AND gates 348, 352, line U-2 is coupled to AND gates 350, 354 et seq.

Oscillator 356, which may generate 100 KC pulses, is enabled or turned "on" by each pulse appearing in output circuit A of pulse generator wheel 104 (FIG. 5). Dividing circuit 358 coupled to output circuit 360 disables or turns "off" the oscillator. In the illustrated embodiment in which oscillator 356 generates pulses at a 100 KC rate and dividing circuit 358 divides by 100, each pulse provided in output circuit A of pick-up 108 associated with pulse generator wheel 104 will result in the generation of 100 pulses in output circuit 360 and thus, each revolution of shaft 24 and flyer 22 results in the generation of 1,000 pulses. It will be readily understood that a pulse generator directly driven from shaft 24 and providing 1000 pulses per revolution may be employed.

Pitch selecting switches 166, 168 have their output circuits coupled to set rate modifying counter 362 to which oscillator 356 is coupled. Rate modifying counter 362 extracts from the 1000 pulses per turn provided by oscillator 356 the number of pulses selected by the respective pitch selecting switch 166, 168, the resultant pulses being substantially evenly spaced in output circuit 364. Thus, assuming that pitch selecting switch 166-1 has been set to select 0.050 inches (thousandths) per turn, 50 substantially evenly spaced pulses will appear in output circuit 364 of rate modifying counter 362 in response to each 1,000 pulses applied thereto from oscillator 356.

The preselected number of pulses appearing in output circuit 364 of rate modifying counter 362 are applied to the plus or minus input circuits of anti-coincidence and sign detecting circuit 366 by AND gates 368, 370 depending upon the energization of the R or L output circuits of mode logic flip-flop 286 (FIG. 7), i.e., depending upon whether flyer 22 is to be traversed toward the right or left as viewed in FIG. 5. Left and right output circuits C of linear motion pulse generator 110 are also coupled to anti-coincidence and sign detecting circuit 366, pulse generator 110 generating 1,000 pulses per inch of linear movement of carriage 34 and flyer 22 in the illustrated embodiment. Thus, the plus-minus output circuits of anti-coincidence and sign detection circuit 366 are coupled to add/subtract counter 372 which has its output circuit coupled to digital-to-analog converter 374. Converter 374 has its plus and minus output circuits D/AR and D/AL respectively coupled to the servo valve logic 206 (FIG. 5) thereby to actuate servo valve 58 and cylinder 48 as above described.

It will be seen that the inches-per-turn logic system shown in FIG. 9 and the servo valve logic system shown in FIG. 5 form a closed loop servo system, linear motion pulse generator 110 generating a fixed, predetermined number of pulses for each inch of linear movement of carriage 34 and flyer 22, pulse generator wheel 109, oscillator 356 and divider 358, rate modifying counter 362 and pitch selecting switches 166, 168 generating a preselected number of pulses for each revolution of shaft 24 and flyer 22 corresponding to the desired incremental linear movement of carriage 34 and flyer 22 during one revolution of the shaft and flyer, and anti-coincidence and sign detection circuit 366, add/subtract counter 372 and digital-to-analogue converter 374 comparing the pulse rates of the pulse trains and generating an error signal in response to a difference therein which is applied to actuate cylinder 48 to move carriage 34 and flyer 22 in a direction and at a rate to reduce the error signal to zero thereby causing flyer 22 to wind wire 70 on the steps of coil forms 134 at the desired pitch for each coil form step.

In the illustrated embodiment in which 1,000 pulses are initially generated in response to each revolution of shaft 24 and flyer 22, and 1,000 pulses are generated in response to each inch of linear movement of carriage 34 and flyer 22, it will be seen that if a pitch of one turn per inch is desired, the entire 1,000 pulses per turn provided in output circuit 360 of oscillator 356 is compared with the thousand pulses per inch output of linear motion pulse generator 110, the resulting error being zero in the event that carriage 34 and flyer 22 are moved by cylinder 48 1 inch during one revolution of shaft 24 and flyer 22. It will thus be seen that one pulse is provided in output circuits C of linear motion pulse generator 110 in response to each 0.001 of linear movement of carriage 34 and flyer 22 and therefore, in order to move the carriage and flyer any given distance during one turn, it is merely necessary to provide a corresponding number of pulses for comparison with the linear motion pulses. Thus, if a pitch of 0.050 per turn is desired for a given layer of a given coil, the respective switch 166, 168 is set to preselect that number, i.e., 50, with the result that rate modifying counter 362 provides fifty pulses in its output circuit 364 in response to each revolution of shaft 24 and flyer 22. The comparing circuit 366, 372, 374 will thus compare the 50 pulses provided by rate modifying counter 362 with the pulses provided by linear motion pulse generator 110 and will control the rate of movement of cylinder 48 and carriage 34 so that 50 linear motion pulses are generated during the one turn of the shaft and flyer with the result that carriage 34 and flyer 22 will be moved 0.050 inch during one revolution of the shaft. It will readily be seen that it is merely necessary to preselect a different number of pulses per turn to be provided by rate modifying counter 362 in order to provide a different predetermined linear movement per turn.

Add/subtract counter 372 is also coupled to binary-to-digital converter 376 which in turn is coupled to "digital-to-analog" display device 170 which thus continuously displays the error in thousandths of an inch.

Figure 10:
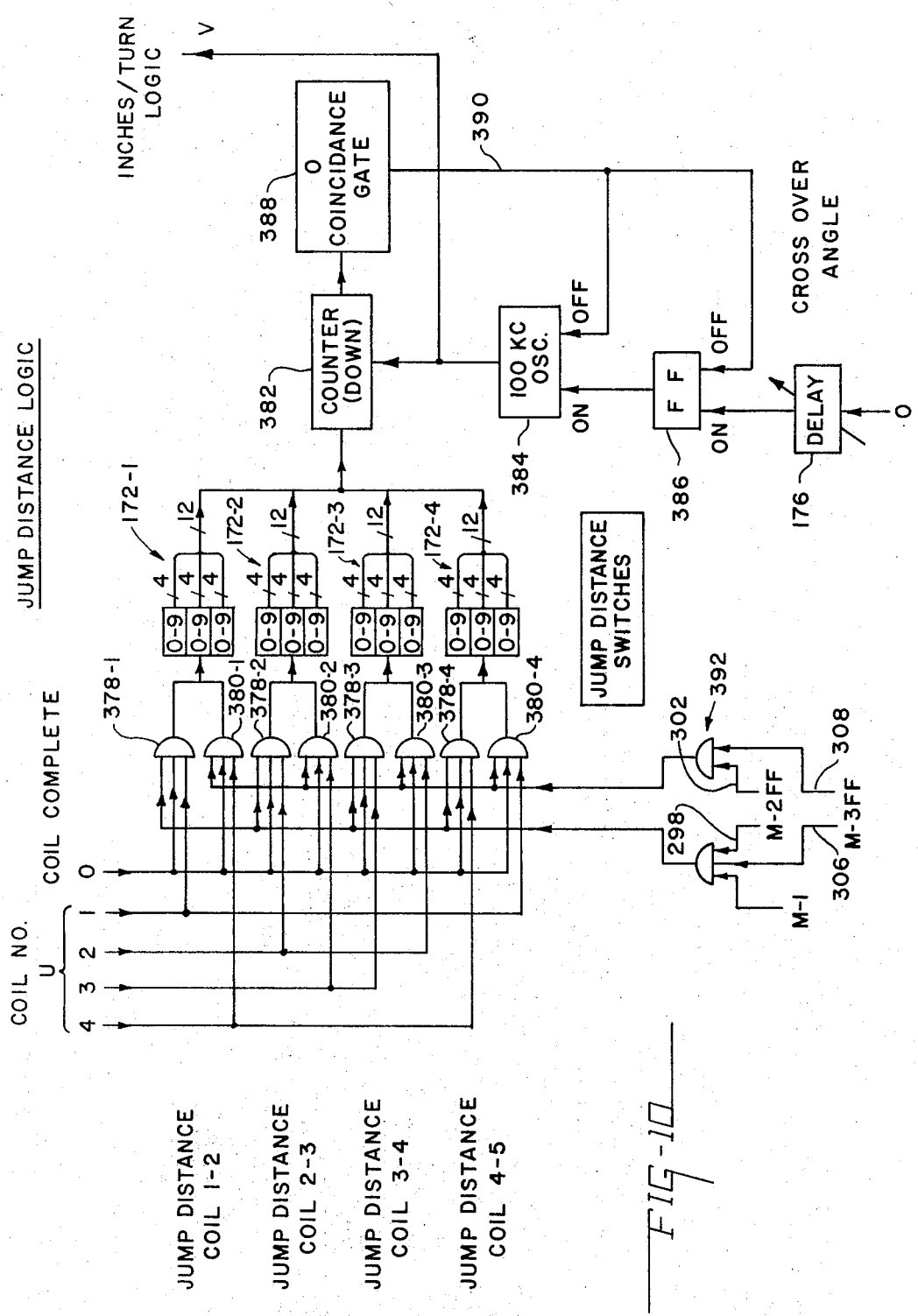
FIG. 10 schematically illustrates the jump distance logic portion of the control system.

Referring now to FIG. 10 in addition to FIG. 9, it will be seen that in order to provide the requisite step or jump distance between adjacent coils, it is merely necessary to apply additional pulses to the comparator circuits 366, 372, 374 momentarily to provide a higher inches per turn ratio or pitch. This is accomplished in the illustrated embodiment by the jump distance logic circuit of FIG. 10 which includes jump distance switches 172 which are preset to cause the circuit to apply an additional predetermined number of pulses to the comparator circuit 276, 272, 274 thus to speed up the traverse of carriage 34 and flyer 22 until the error resulting from those additional pulese has been reduced to zero (which occurs in about one turn).

Here, coil complete output circuit O from the layer counter coincidence gate 258 (FIG. 6) is coupled to each pair of AND gates 378, 380 which respectively have their output circuits coupled to jump distance switches 172. Coil number lines U 1-4 are coupled to AND gates 378, 380, as shown, as are mode switch line M-1, and output circuits 298, 302 and 306, 308 of the mode two and mode three flip-flops 290, 304. Jump distance switches 172 provide a binary codes number corresponding to the preselected jump distance and have their output circuits coupled to set counter 382 which counts-down pulses supplied by oscillator 384 which may have a 100 KC pulse repetition rate.

Coil complete output circuit O (FIG. 6) is coupled by crossover angle delay circuit 176 to set flip-flop 386 so as to enable or turn "on" oscillator 384. Zero coincidence of the number of pulses provided by oscillator 384 with the preselected number set into counter 382 by the respective jump distance switch 172 is detected by zero coincidence gate 388 resulting in a signal in its output circuit 390 which turns "off" oscillator 384 and resets flip-flop 386. Thus, oscillator 384 will provide in its output circuit V the number of pulses selected by the respective jump distance switch 172. Output circuit V of oscillator 384 is coupled to the inches per turn logic circuit of FIG. 9 and applies the jump distance pulses provided by oscillator 384 to the anti-coincidence and sign detecting gate 366 in the same manner as the pulses provided by rate modifying counter 362.

Assuming now that a jump distance of one-half inch is required between two adjacent coils, the respective jump distance switch 172 is set to 500 resulting in the application of 500 additional pulses to the inches-per-turn comparator circuits 366, 372, 374. A large error thus immediately appears in add/subtract counter 372 which is applied to cause cylinder 48 to move carriage 34 and flyer 22 rapidly in the indicated direction to eliminate the error thus providing the requisite jump or stepping distance.

It will be understood that logic circuit 392 determines the order of enabling jump distance switches 172 as the respective coils are completed. In mode one, jump distance switch 172-1 determine the jump distance between the coils wound on coil form steps 136 and 138, jump distance switch 172-2 determines the jump distance between the coils wound on coil form steps 138, 140, jump distance switch 172-3 determines the jump distance between the coils wound on coil form steps 140 and 142, and jump distance switch 172-4 determines the jump distance between the coils wound on coil form steps 142 and 144. Thus, in mode one, AND gates 378 are sequentially enabled in ascending order as coils one through four are completed. In mode two, jump distance switch 172-1 determines the jump distance between the coils wound on coil form steps 144 and 142, jump distance switch 172-2 determines the jump distance between the coils wound on coil form steps 142 and 140, et seq. Thus, output circuit 298 of mode two flip-flop 296 is coupled to enable AND gates 378 so that jump distance switches 172 are enabled in ascending order as coils number one through four are wound during winding of the first pole group of coils, and AND gates 380 are enabled by output circuit 302 of flip-flop 296 during winding of the second pole group of coils so that jump distance switches 172 are enabled in descending order as coils numbers four through one of the second pole group are wound. In mode three, jump distance switches 172 determine the jump distance between coils in the same sequence as in the case of mode number one. Thus, during winding of the first part of a pole group of coils in mode three, AND gates 378 are enabled by the signal in output circuit 306 of mode three flip-flop 304 thereby to enable jump distance switches 172 in ascending order as the first part of coils numbers one through four are wound, and AND gates 380 are enabled by the signal in output circuit 308 of flip-flop 304 during winding of the second part of the coils so that jump distance switches 172 are enabled in descending order.

While hydraulic cylinder 48 has been shown and described for linearly moving carriage 34, shaft 24 and flyer 22, it will readily be understood that the carriage and flyer may be moved linearly by other devices such as a stepping motor or a variable speed direct current motor driving a lead screw.

While there have been described above the principles of this invention in connection with specific apparatus, it is to be clearly understood that this description is made only by way of example and not as a limitation to the scope of the invention.

What is claimed is:

1. In apparatus for winding at least two concentric dynamoelectric machine field coils upon a coil form having at least two steps of progressively smaller size, said apparatus including:

flyer means mounted on a shaft for winding wire upon said steps to form said coils,
means for rotatably supporting said shaft,
first drive means for rotating said shaft and flyer means relative to said coil form,
and means for mounting said supporting means for linear movement parallel with the axis of said shaft, the improvement comprising:
linear-acting fluid power drive means for moving said supporting means linearly on said mounting means thereby to traverse said flyer means with respect to said coil form,
a. first means for generating a first electrical signal having a first characteristic proportional to a predetermined incremental linear movement of said supporting means,
b. second means for generating a second electrical signal having a second characteristic proportional to a predetermined incremental angular movement of said shaft,
c. means for comparing said first and second characteristics and for generating an electrical error signal in response to a difference therein,
d. means for controlling the speed of one of said drive means in response to said error signal thereby to provide a predetermined pitch for said coils,
e. manually adjustable means for selectively varying the ratio of one of said first and second characteristics with respect to the respective incremental movement thereby to vary said pitch,
f. means for generating a third electrical signal having a third predetermined characteristic in response to completion of winding the first of said coils on the first of said coil form steps,
g. and means for applying said third signal to said comparing means for comparision of its characteristics with said first signal characteristic and generation of a second error signal in response to a difference therein, said controlling means (d) also controlling the speed of one of said drive means in response to said second error signal thereby to provide a connection having a predetermined pitch between said first coil and the second coil on the second one of said coil form steps.

2. The apparatus of claim 1 wherein said varying means (e) includes:
1. first means for manually preselecting a predetermined ratio for a first coil wound on a first of said coil form steps
2. and second means for manually preselecting a predetermined ratio for a second coil wound on a second of said coil form steps.

3. The apparatus of claim 2 further comprising:
f. programming means including:
1. means for initially actuating said first preselecting means (e1) thereby to wind said first coil with a first pitch,
2. and means for automatically actuating said second preselecting means (e2) in response to completion of winding said first coil thereby to wind said second coil with a second pitch.

4. The apparatus of claim 1 wherein said controlling means (d) controls the speed of said fluid power drive means.

5. The apparatus of claim 4 wherein said fluid power drive means includes a fluid power cylinder and a control valve therefor actuated by said error signal.

6. The apparatus of claim 1 further comprising:
i. means for manually selectively varying said third characteristic thereby to vary said connection pitch.

7. The apparatus of claim 1 wherein each of said first, second and third signals is a pulsed signal, said characteristics being numbers of pulses.

8. The apparatus of claim 7 wherein said first generating means (a) includes:
1. a pulse generator coupled to said supporting means and driven thereby to generate a predetermined number of first signal pulses in response to each said predetermined incremental linear movement, said second generating means (b) including:
1. selectively adjustable means for providing a first preselected number of second signal pulses in response to each revolution of said shaft during winding of said first coil thereby to wind said first coil with a first pitch, and a second preselected number of second signal pulses in response to each revolution of said shaft during winding of said second coil thereby to wind said second coil with a second pitch, said varying means (e) being coupled to said adjustable means (b1) for selecting the number of second signal pulses provided thereby, said third generating means (g) including:
1. means for generating a preselected number of third signal pulses.

9. The apparatus of claim 8 wherein said second generating means (b) further includes:
2. pulse generating means for generating a predetermined number of pulses in response to each revolution of said shaft, said adjustable means (b1) including:
3. means for selectively extracting a preselected number of second signal pulses from each said predetermined number of pulses generated by said pulse generating means (b2), said varying means (e) including:
1. first manually actuated selecting means for actuating said extracting means (b3) to extract said first preselected number of second signal pulses,
2. and second manually actuated selecting means for actuating said extracting means (b3) to extract said second preselected number of second signal pulses.

10. The apparatus of claim 9 further comprising:
j. means for coupling said first selecting means (e1) to said extracting means (b3) during winding of said first coil,
k. and means for automatically coupling said second selecting means (e2) to said extracting means (b3) in response to completion of winding said first coil.

11. The apparatus of claim 9 wherein each of said selecting means (e1, e2) includes:
3. means for generating a binary coded number corresponding to the respective preselected number, said extracting means (b3) including:
4. a digital counter 12. The apparatus of claim 11 wherein each of said generating means (e3) includes:
4. a plurality of multiple position selector switches.

13. The apparatus of claim 11 wherein said comparing means (c) includes:
1. a digital counting circuit.

14. The apparatus of claim 1 wherein each of said coils comprises a preselected number of layers each having a preselected number of turns, and further comprising:
l. first means for manually preselecting the number of coils to be wound,
m. second means for manually preselecting the number of layers for each coil,
n. third means for manually preselecting the number of turns for each layer of each coil,
o. first settable means for counting coils,
p. second settable means for counting layers,
q. third settable means for counting revolutions of said shaft and flyer means thereby to count turns,
r. means coupling said turns preselecting means (n) to said turn counting means (q) for setting the same to count the respective number of preselected turns,
s. means coupling said layer preselecting means (m) to said layer counting means (p) for setting the same to count the respective number of preselected layers,
t. means coupling said coil preselecting means (l) to said coil counting means (o) for setting the same to count the respective number of preselected coils, said varying means (e) including:
1. means for manually preselecting said ratio for each of said coils thereby to preselect the pitch thereof, said turn counting means (q) including:
1. means coupled to said layer counting means (p) for actuating the same in response to completion of the respective number of preselected turns in each layer, said layer counting means (p) including:

1. means coupled to said coil counting means (o) for actuating the same in response to completion of the respective number of preselected layers in each coil, and
2. means for indicating the number of the respective layer being wound,
u. means coupling said layer number indicating means (p2) to said fluid power drive means for determining the direction of linear movement of said mounting means, shaft and flyer in response to the number of the layer being wound, said coil counting means (o) including:
1. means for indicating the number of the respective coil being wound,
v. means coupling said layer number indicating means (p2) and said coil number indicating means (o1) to said turns preselecting means (n) for actuating the same to select the number of turns for the respective layer and coil being wound,
w. means coupling said coil number indicating means (o1) to said layer preselecting means for actuating the same to select the number of layers for the respective coil being wound, and
x. means coupling said coil number indicating means (o1) to said pitch preselecting means (e1) for actuating the same to select the pitch for the respective coil being wound.

15. The apparatus of claim 14 wherein each of said first and second signals is a pulsed signal, said first generating means (a) including:
1. a pulse generator coupled to said supporting means and driven thereof to generate a predetermined number of first signal pulses in response to each said predetermined incremental linear movement, said second generating means (b) including:
1. pulse generating means for generating a predetermined number of pulses in response to each revolution of said shaft, and
2. means for selectively extracting a preselected number of second signal pulses from each said predetermined number of pulses generated by said pulse generating means (b1),
y. means coupling said pitch preselecting means (e1) to said extracting means (b2) for setting the same to extract the respective number of second signal pulses, each of said preselecting means (l, m, n, e1) including means for generating a binary coded number corresponding to the respective preselected number,
each of said counting means (o, p, q) including a digital counter, said extracting means (ba) including a digital counter, said comparing means (c) including:
1. a digital counting circuit, and
2. a digital to analog converting circuit coupled to said controlling means.

16. The apparatus of claim 15 wherein said generating means (g) comprises
z. means for generating third signal pulses,
aa. means coupled to said generating means (z) manually for preselecting a predetermined number of said third signal pulses to be generated thereby, said coil counting means (o) including:
2. means for indicating completion of a coil being wound, said coil indicating means (o1, 02) being coupled to said preselecting means (aa) for actuating the same to select a predetermined number of said third signal pulses in response to completion of a respective coil, and
ab. means for coupling said preselecting means (aa) to said comparing means (c) for applying said predetermined number of third signal pulses thereto for comparison with said first signal pulses and generation of a second error signal in response to a difference therein, said controlling means (d) also controlling the speed of one of said drive means in response to said second error signal thereby to provide a connection having a different predetermined pitch between each of said coils.

17. The apparatus of claim 16 wherein said preselecting means (aa) includes:
1. a digital counter coupled to said third signal generating means (z) for counting said third signal pulses,
2. means for generating a binary coded number corresponding to the respective preselected number of third signal pulses coupled to said counter (aa1) for setting the same thereof to preselect the connection pitch between each of said coils,
3. means coupling said coil indicating means (o2) to said third signal generating means (z) for actuating the same in response to completion of a respective coil, and
4. means coupling said counter (aa1) to said third signal generating means (z) for deactuating the same in response to generation of the respective preselected number of third signal pulses, said coil indicating means (o1, 02) being coupled to said generating means (aa2).

18. The apparatus of claim 16 wherein said controlling means (d) is coupled to said fluid power drive means thereby to control the speed and direction of said linear movement in response to said error signals.

19. The apparatus of claim 14 wherein said turn number preselecting means (n) includes:
1. manually actuated means for preselecting the number of turns for one of the first and last layers of each coil, and
2. manually actuated means for preselecting the same number of turns for all of the remaining layers of each coil, said pitch preselecting means (e1) including:
2. manually actuated means for preselecting the pitch for said one of said first and last layers of each coil, and
3. manually actuated means for preselecting the same pitch for all of the remaining layers of each coil.

20. The apparatus of claim 1 wherein said apparatus includes at least two of said coil forms each having a distal end and a proximal end mounted on a rotatable turret, the smallest of said steps being at said distal end and the largest of said proximal end, and further comprising:
ac. means for indexing said turret thereby sequentially to position said coil forms in winding relationship with said flyer means,
ad. means coupled to said controlling means (d) for selectively operating fluid power drive means to move said supporting means, shaft and flyer means in a first direction from said proximal end toward said distal end of the respective coil form, and in a second direction from said distal end toward said proximal end, ae. manually actuated means coupled to said indexing means (ac) and operating means (ad) for selectively programming the same in any one of at least three modes, 1. said programming means (ae), in said first mode thereof, including means for sequentially actuating said operating means (ad) to position said flyer means in winding relationship with the largest step of one of said coil forms, actuating said operating means (ad) to move said flyer means in said first direction thereby to wind said coils on said steps of said one coil form progressing from the largest to the smallest, actuating said indexing means (ac) to move said one coil form out of winding relationship and a second coil form into winding relationship with said flyer means, actuating said operating means (ad) to move said flyer means in said second direction to position said flyer means in winding relationship with the largest step of the second coil form, and actuating said operating means (ad) to move said flyer means in said first direction thereby to wind said coils on said steps of said second coil form progressing from the largest to the smallest, 2. said programming means (ae) in said second mode thereof, including means for sequentially actuating said operating means (ad) to position said flyer means in winding relationship with the smallest step on one of said coil forms, actuating said operating means (ad) to move said flyer means in said second direction thereby to wind said coils on said steps of said one coil form progressing from the smallest to the largest, actuating said indexing means (ac) to move said one coil form out of winding relationship and a second coil form into winding relationship with said flyer means, and actuating said operating means (ad) to move said flyer means in said first direction thereby to wind said coils on the steps of said second coil form progressing from the largest to the smallest, 3. said programming means (ae) in said third mode thereof, including means for sequentially actuating said operating means (ad) to position said flyer means in winding relationship with the largest step of one of said coil forms, actuating said operating means (ad) to move said flyer means in said first direction thereby to wind first parts of said coils on said steps of said one coil form progressing from the largest to the smallest, and actuating said operating means (ad) to move said flyer means in said second direction thereby to wind second parts of said coils on said steps of said one coil form progressing from the smallest to the largest.

21. A method of winding at least two concentric dynamoelectric machine field coils upon a coil form having at least two steps of progressively smaller size employing apparatus including:
flyer means mounted on a shaft for winding wire upon said steps to form said coils,
means for rotatably supporting said shaft,
first drive means for rotating said shaft and flyer means relative to said coil forms,
means for mounting said supporting means for linear movement parallel with the axis of said shaft, and linear-acting fluid power drive means for moving said supporting means linearly on said mounting means thereby to traverse said flyer means with respect to said coil form, said method comprising the steps of:

a. generating a first electrical signal having a first characteristic proportional to a predetermined incremental linear movement of said supporting means, b. generating a second electrical signal having a second characteristic proportional to a predetermined incremental angular movement of said shaft, c. comparing said first and second characteristics and generating an electrical error signal in response to a difference therein, d. controlling the speed of one of said drive means in response to said error signal thereby to provide a predetermined, pitch for said coils, e. manually selectively varying the ratio of one of said characteristics with respect to the respective incremental movement thereby to vary said pitch, f. generating a third electrical signal having a third predetermined characteristic in response to completion of winding the first of said coils on the first of said coil form steps, g. comparing said third signal characteristic with said first signal characteristic and generating a second error signal in response thereto, h. and controlling the speed of one of said drive means in response to said second error signal thereby to provide a connection having a predetermined pitch between said first coil and the second coil on the second of said coil form steps.

22. The method of claim 21 wherein each of said first, second and third signals is a pulsed signal, said characteristics being numbers of pulses, said generating step (f) comprising:
1. generating a preselected number of said third signal pulses.

23. The method of claim 22 wherein said generating step (a) comprises:
1. generating a predetermined number of first signal pulses in response to each said predetermined incremental linear movement of said supporting means,
and said generating step (b) comprising:
1. generating a number of said second signal pulses in response to each revolution of said shaft,
said varying step (e) comprising:
1. manually controlling said generating step (b) to provide a first predetermined number of second signal pulses in response to each revolution of said shaft thereby to provide a first predetermined pitch for a first coil being wound on a first of said coil form steps,
2. manually controlling said generating step (b) to provide a second predetermined number of second signal pulses in response to each revolution of said shaft thereby to provide a second predetermined pitch for a second coil being wound on a second of said coil form steps,
said comparing step (c) comprising:
1. continuously digitally subtracting one of said predetermined number of pulses from the other thereby to provide said error signals,
said controlling step (d) comprising:

1. fluid controlling the speed of said second drive means.

24. The method of claim 22 wherein said generating step (a) comprises:
1. generating a predetermined number of first signal pulses in response to each said predetermined incremental linear movement of said supporting means, said generating step (b) comprising:
1. generating a number of second signal pulses in response to each revolution of said shaft, said varying step (e) comprising:
1. manually selectively controlling said generating step (b) to provide a preselected number of second signal pulses in response to each revolution of said shaft, said controlling step (d) comprising:
1. controlling the speed of said second drive means.

25. The method of claim 24 wherein said varying step (e) further comprises:

2. manually controlling said generating step (b) to provide a first predetermined number of said signal pulses in response to each revolution of said shaft thereby to provide a first predetermined pitch for a first coil being wound on a first of said coil form steps, and
3. manually controlling said generating step (b) to provide a second predetermined number of second signal pulses in response to each revolution of said shaft thereby to provide a second predetermined pitch for a second coil being wound on a second of said coil form steps.

26. The method of claim 25 wherein said comparing step (c) comprises:
1. continuously subtracting one of said predetermined number of pulses from the other thereby to provide said error signal.

27. The method of claim 26 wherein said subtracting step (c1) is performed digitally.

* * * * *

UNITED STATES PATENT OFFICE
CERTIFICATE OF CORRECTION

Patent No. 3,851,682                    Dated December 3, 1974

Inventor(s) Ralph A. Vogel; Donald L. Anderson; Robert A. Chattin; & Joel L. Mosak It is certified that error appears in the above-identified patent and that said Letters Patent are hereby corrected as shown below:

Col. 1, line 61,        "can" should be -- cans --
Col. 4, line 33,        -- segmented -- should be inserted after "suitable"
Col. 12, line 35,       -- a-- should be inserted after "of" (first occurrence)
Col. 14, line 23,       -- " -- should appear after ".001"
Col. 14, line 28        -- " -- should be inserted after ".050"

Cl. 16, Col. 19, line 60-61,   "manually for" should be -- for manually --
Cl. 23, Col. 23, line 1        "fluid" should be deleted before "controlling" and "second" should be -- fluid --

Signed and sealed this 3rd day of June 1975.

(SEAL)
Attest:

RUTH C. MASON
Attesting Officer

C. MARSHALL DANN
Commissioner of Patents
and Trademarks